April 14, 1964 C. E. BROOKS ETAL 3,129,292

DISTRIBUTED TELEPHONE LINE CONCENTRATOR SYSTEM

Filed Dec. 29, 1960 7 Sheets-Sheet 1

INVENTORS C. E. BROOKS
W. C. SAND
BY
S E Hollander
ATTORNEY

INVENTORS C. E. BROOKS
W. C. SAND
BY
S E Hollander
ATTORNEY

INVENTORS C. E. BROOKS
W. C. SAND
BY S E Hollander
ATTORNEY

DISTRIBUTED TELEPHONE LINE CONCENTRATOR SYSTEM

Filed Dec. 29, 1960 7 Sheets-Sheet 4

INVENTORS C. E. BROOKS
W. C. SAND
BY
S F Hollander
ATTORNEY

April 14, 1964 C. E. BROOKS ETAL 3,129,292

DISTRIBUTED TELEPHONE LINE CONCENTRATOR SYSTEM

Filed Dec. 29, 1960 7 Sheets-Sheet 5

INVENTORS C. E. BROOKS
W. C. SAND
BY
S E Hollander
ATTORNEY

April 14, 1964 C. E. BROOKS ETAL 3,129,292

DISTRIBUTED TELEPHONE LINE CONCENTRATOR SYSTEM

Filed Dec. 29, 1960 7 Sheets-Sheet 6

CALL START

INVENTORS C. E. BROOKS
W. C. SAND

BY S E Hollander

ATTORNEY

DISTRIBUTED TELEPHONE LINE CONCENTRATOR SYSTEM

Filed Dec. 29, 1960

INVENTORS C. E. BROOKS
W. C. SAND
BY
S E Hollander
ATTORNEY 3,129,292
Patented Apr. 14, 1964

3,129,292

DISTRIBUTED TELEPHONE LINE CONCENTRATOR SYSTEM

Chester E. Brooks, Montvale, and William C. Sand, Chatham, N.J., assignors to Bell Telephone Laboratories, Incorporated, New York, N.Y., a corporation of New York Filed Dec. 29, 1960, Ser. No. 79,385
22 Claims. (Cl. 179—18)

This invention relates to remote line concentrators and more particularly to distributed line concentrators in which portions of the remote concentrator equipment are distributed throughout the field contiguous to the location of the individual subscribers.

In brief, remote line concentration encompasses the grouping or "concentration" of a relatively larger number of substation lines at a locale remote from the central office. A smaller number of trunks is then extended from the remote switching unit to the central office. The substation lines do not have individual direct access to the central office but instead are terminated at the remote switching unit and thereafter share common branches or trunks to the central office. The immediate advantages to be derived from such an arrangement are the reductions in outside plant and cable costs since each subscriber substation no longer need be directly connected to the central office.

Although the benefits of remote line concentration are obvious, the manner in which the concentration is achieved has become a subject of increasing emphasis. In short, the genesis of remote line concentration derived in part from the stringency of the requirement that each line be directly connected to the central office. In overcoming this burden, a number of prior art investigators proposed a centralized remote switching unit or concentrator to which each line was connected but from which a proportionately smaller number of trunks extended to the central office. Although completely operative and useful these prior art concentrators present a paradox. Since the motivating purpose of concentration as described above was to obviate the necessity for connecting each subscriber line to the central office, a solution which proposes a centralized remote line concentrator and requires the inexorable connection to each line to a centralized concentrator unit is, at least in part, self-defeative.

It is therefore an object of this invention to provide a remote line concentrating system in which each line is not individually connected to a centralized remote switching unit.

Still another object of this invention is to provide a remote line concentrator in which the component elements of the concentrator are distributed in numerous physically distinct areas proximate to the location of the calling substation lines.

A further object of this invention is to provide a distributed remote line concentrator having remote switching equipment of improved design.

Still another object of this invention is to provide a distributed remote line concentrator adapted for convenient utilization with most conventional telephone switching systems.

In following the progressive development of telephone line concentrators, it is of interest to note that one of the most fundamental and recurring problems is that occasioned by the divorcement of the individual substation line from its traditional bond to the central office. Thus, a routine function such as line supervision for off-hook, on-hook, dialing, etc. becomes a significant problem in view of the interposition of the remote line concentrator between the central office and the substation lines. While in prior practice the supervision could be accomplished by relatively simple sensory units, such as a line relay, the central office must now be apprised in other ways of the condition at the remote substantial. In fact, the facilities for scanning the substation lines and conveying the information derived from such scanning to the central office have attained degrees of remarkable sophistication and complexity. Since the necessity for such scanning arrangements derives from the use of the concentrator and did not exist prior thereto, the costs attendant thereon are burdensome.

An effort has been made to minimize the complexity of the scanning equipment by providing control conductors in the form of a multiplicity of number group conductors to which each substation line is connected in unique fashion representative of the identity of the line in accordance with a code. On a service request call, for example, the substation may be arranged to energize the particular code conductors to which it is connected. As a result, an appropriate number group detector at the central office is energized by the actuated conductors in a manner uniquely representative of the service requesting line. Thereafter, a translation may be made of the number group detector information and apparatus actuated to operate a line relay (conventional existing line relay) in the central office unique to the substation line. Since the latter relay is the same relay which would have been operated if the line were directly connected to the office, a unique mark has been made in the central office equipment to initiate the extension of a channel from the central office to the service requesting line. Under these conditions no continuous or "dynamic" scanning of the substation lines is required. Instead, the number group or control conductors convey information only when it is essential to do so.

Although this arrangement is advantageous, it, of necessity, harbors certain internal limitations. Chief among these is the fact that the central office, since it no longer can "see" the calling substation and react directly to the electrical conditions at said substation, must rely on the information delivered thereto by the control conductors. This type of dependence is permissible if the information conveyed is correct but in telephone practice, where the tradition of accuracy is paramount, the transmisison of spurious information over the control conductors may lead to a wrong connection. Thus, in the illustration described above, assuming that each substation is connected to a pair of number group conductors, difficulties will ensue when more than one subscriber initiate calls simultaneously or substantially simultaneously. If a substation connected to number group conductors 1 and 2 goes off-hook at the same time that a substation connected to number group conductors 2 and 3 goes off-hook, the number group detector will receive signals over three conductors. Although the only correct registrations by the number group detector are 1 and 2 or 2 and 3, there is a possibility of a spurious indication of 1 and 3 which represents a substation not then requesting service, and a connection to which would be invalid.

It is therefore an object of this invention to insure against inaccurate or false registrations on simultaneous service requests.

Still another object of this invention is to provide for precluding the operation of the number group detector as a result of substantially simultaneous service requests by a plurality of substations.

Certain prior art concentrators although completely operative and useful have required circuitry of considerable complexity for rendering the concentrator compatible with existing telephone central office equipment. Others have required that significant innovations or modifications be made in the central office in order to permit the functioning of the concentrator with the office. To the extent that the latter type of alteration is required, the universality of the concentrator itself is diminished. In short, a line concentrator to be widely useful must be arranged in a manner which minimizes the necessity for modifying or otherwise encroaching on existing telephone central office equipment—in view of the prohibitive cost attendant thereon.

It is therefore an object of this invention to provide facilities for adapting a distributed line concentrator to function in combination with a No. 1 crossbar telephone office and other conventional offices.

A further object of this invention is to provide an applique circuit of utmost simplicity and economy for adapting a distributed line concentrator to function in combination with a No. 1 crossbar telephone office.

As a concomitant of concentrator operation, in the past it has sometimes been necessary to establish compatibility between the concentrator equipment and the central office by supplying almost complete memory facilities in the concentrator capable of storing the subscriber identity, the nature of the signal originating from the subscriber substation, the condition of the crosspoints at the remote circuit, etc. Manifestly, the need to record this information represents a burdensome expense in concentrator systems—the more so, since the need does not exist in direct line systems.

An object of this invention is therefore to provide a concentrator system in which it is unnecessary to store information from or to a concentrator subscriber, in the concentrator control circuitry.

An additional object of this invention is to provide applique facilities for a line concentrator system which are designed to utilize existing memory or storage facilities in the central office without the necessity for additional storage equipment in the concentrator circuit.

These and other objects and features of the invention are achieved in an illustrative embodiment in which a remote line concentrator is disclosed which includes a multiplicity of physically separate and distinct line packages or switching elements distributed in the field in a multiplicity of locations proximate to the calling subscriber substation. A plurality of coding or number group conductors, a number group return lead and a release conductor are extended in parallel to the subscriber lines to be connected. In addition, an appropriate number of speech or communication trunks are similarly extended in the field to the substations.

To provide access by a particular substation to the central office a line package individual to the substation includes crosspoints having magnetic reed relays for connecting the tip and ring conductors of the substation line to the tip and ring conductors of each of the communication trunks to which the substation line has access.

In addition, the line package individual to a substation includes facilities for connecting a line to a selected arrangement of number group conductors in accordance with a code identifying the line. Moreover, each line package is directly connected to the number group return lead and to the release lead. When a substation goes off-hook on an originating call, the line package is arranged to provide a momentary pulse of current to each of the number group conductors to which it is connected at the central office. A number group detector at an applique circuit in the conventional crossbar central office responsive to the energization of the number group conductors is utilized to establish the specific combination of energized conductors which, after translation, yields the identity of the calling substation. As a result of the identification procedure, the conventional line relay in the central office to which the line would have been connected if it were directly connected to the office is operated to signal the conventional equipment in the office to initiate the extension of a connection to the calling substation line.

A particular advantage of the present arrangement is invoked when a plurality of calling substations excite their respective number group conductors with pulses simultaneously. It is apparent that under such conditions the total number of number group conductors which are excited, exceeds the normal number. As a result, equipment has been disposed in the central office which will react to the excess number of energized number group conductors by blocking further action of the number group detectors thereby avoiding the possibility of rendering a spurious service request identification.

In the instant invention a significant advance has been made which transcends the limitations experienced by prior art concentrators which require comprehensive memory facilities in the control circuit. The advance here is of a nature which permits operation of the concentrator circuit without memory facilities, as such. Instead, the applique circuit is designed in the nature of a transiently operated circuit which permits a service request call for example to filter directly through it without leaving a "residue" of information pertinent to the substation in the filter circuit.

This advantage is achieved by arranging the applique circuit to operate on a momentary basis in response to a service request whereby the line relay (existing conventional line relay) in the No. 1 crossbar office is activated and is used as the memory device or, in effect, the anchor point for further processing of the call. The additional benefits which derive from this manner of operation beyond the important savings in memory facilities are manifold and include the fact that the entire applique circuit need only be connected on an instantaneous shared basis with the substation lines in the manner of expensive common equipment in the crossbar office such as senders, markers, etc. The latter equipment in common practice is used only temporarily during a call to service a line or trunk and thereafter all information regarding the line or trunk is cleared from the common equipment and stored in less valuable instrumentalities.

The applique circuit in its function as a "filter" or "sieve" in directing the call to the appropriate line relay in the central office by, in effect, translating the concentrator number to the No. 1 crossbar equipment number immediately "forgets" its transaction with the service requesting substation. As a result, when the central office begins its process of extending a channel to the calling substation the concentrator equipment must be re-apprised of the information pertinent to the call and this is done by the expedient of extending a connection from the tip vertical of the primary crossbar switch (the memory storage of the line equipment number) to a gas tube translator which, in effect, regenerates the "concentrator number" from the equipment number for processing by the applique circuit.

This two-way translation of information from concentrator number to equipment number and vice versa, whenever necessary, with the long term information being reposed in the line relay, crossbar vertical, etc., all of which are existing equipment in the No. 1 office and do not represent an additional outlay, provides a unit of high efficiency and simple construction.

A feature of this invention includes applique circuitry for arranging a distributed line concentrator to function in combination with a No. 1 crossbar office.

Still another feature of this invention includes a plurality of number group detecting devices responsive to pulses on number group conductors for registering information representative of the identity of a service request line.

Another feature of this invention includes a detector responsive to the reception of more than a predetermined number of pulses for preventing a response to said pulses.

A further feature of this invention includes translation facilities responsive to the information stored in said number group detectors to identify the line represented by said information.

Another feature of this invention includes facilities for operating and locking up the conventional existing line relay in response to the operation of the translating facilities.

Still another feature of this invention includes a polar relay detector responsive to the energization of more than a predetermined number of number group conductors for blocking further action by said applique circuit.

Another feature of this invention includes an applique circuit adapted to function in combination with a remote distributed line concentrator system using magnetic reed relays having latching capabilities.

A further feature of this invention includes an applique circuit designed to utilize existing central office equipment as the required memory circuitry.

A further feature of this invention includes arrangements for verifying the successful actuation of the circuit which actuates magnetic reed relay crosspoints.

These and other objects and features of the invention may be more readily apprehended from an examination of the following specification, appended claims and attached drawing in which:

Figure 1A:
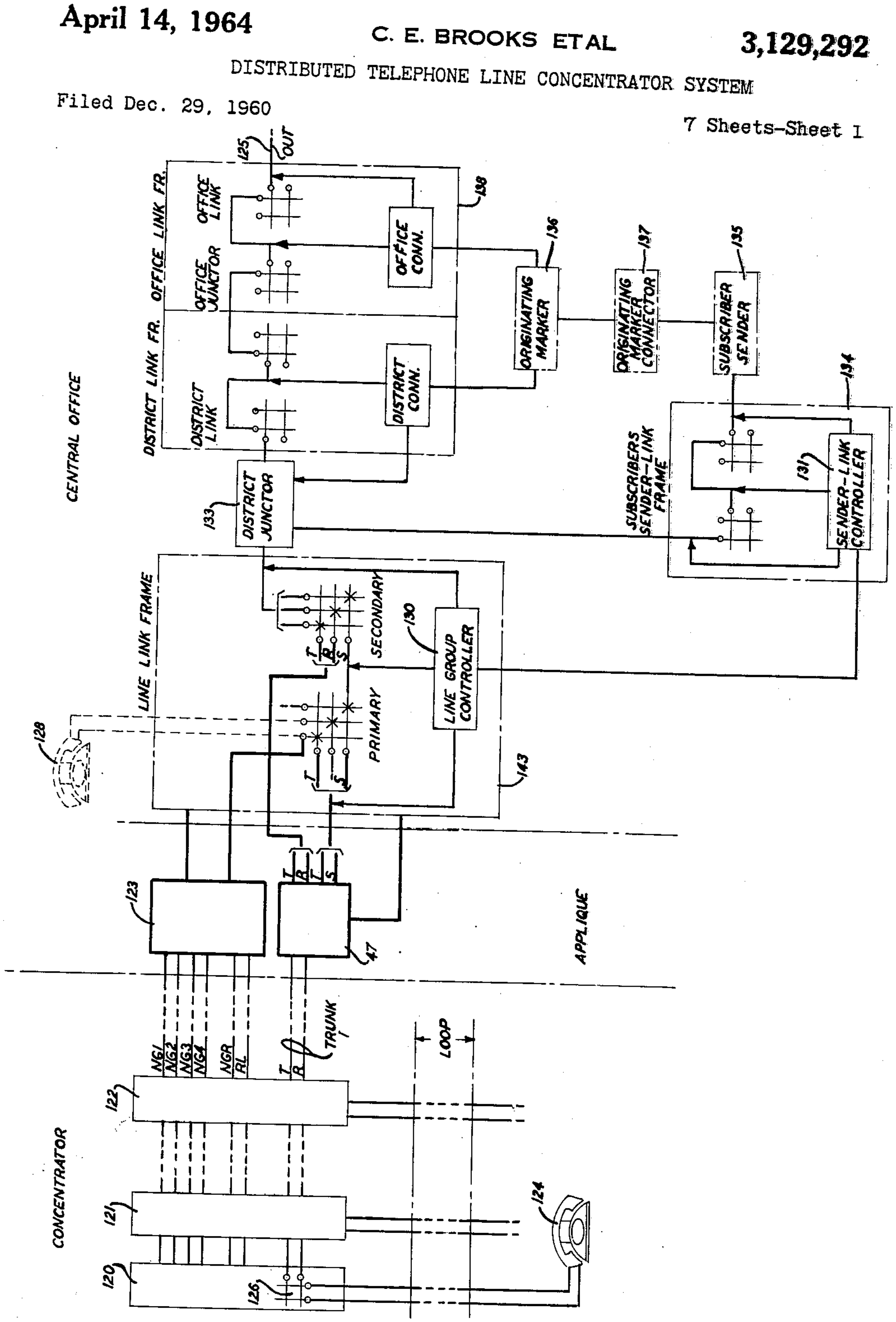
FIG. 1A shows an outline drawing of the invention in combination with a conventional No. 1 crossbar telephone office when a call originates at the remote concentrator.
Figure 1B:
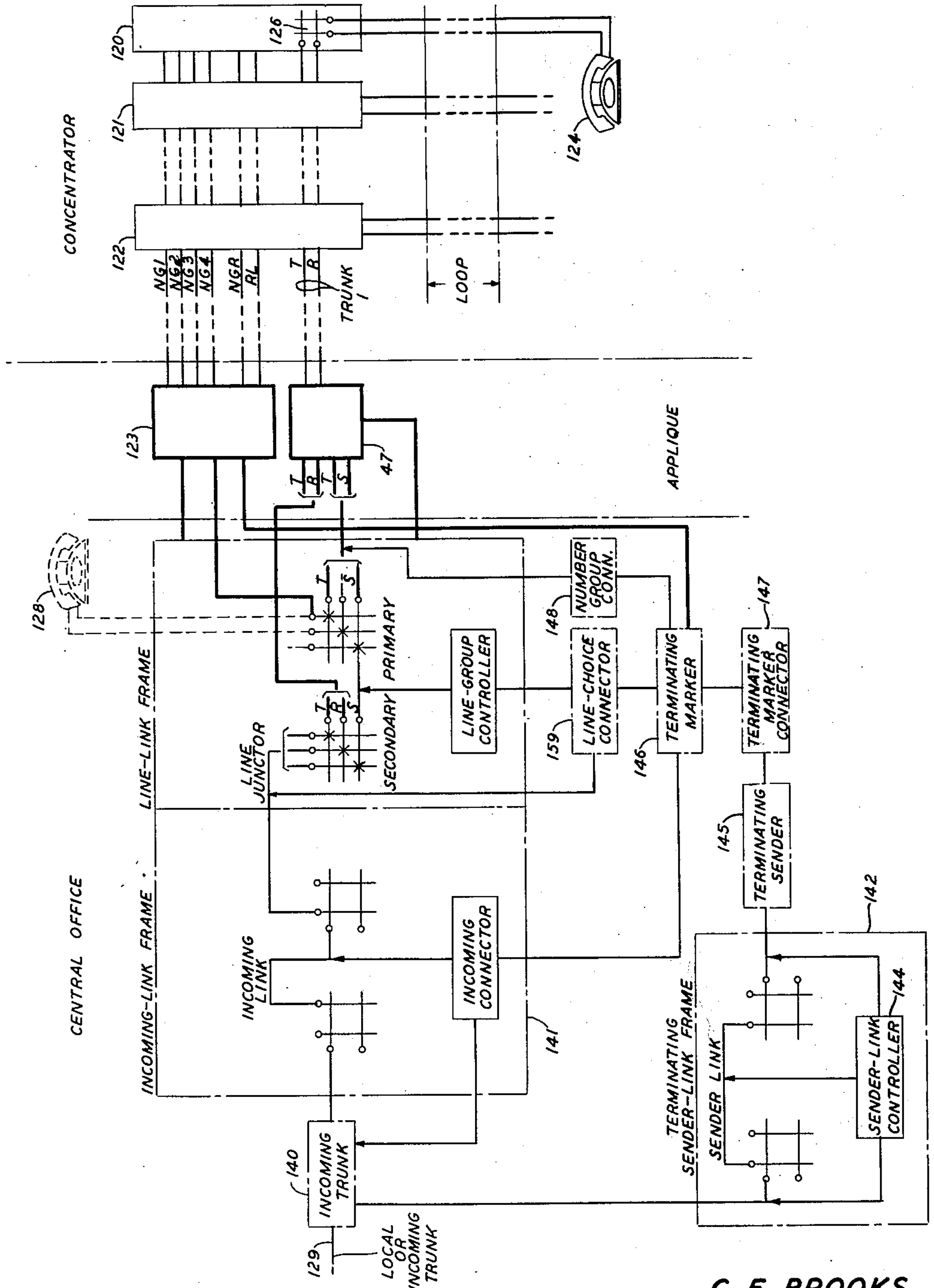
FIG. 1B illustrates in outline form a combined arrangement including the distributed concentrator during the processing of a terminating call to a concentrated line.
Figure 2:
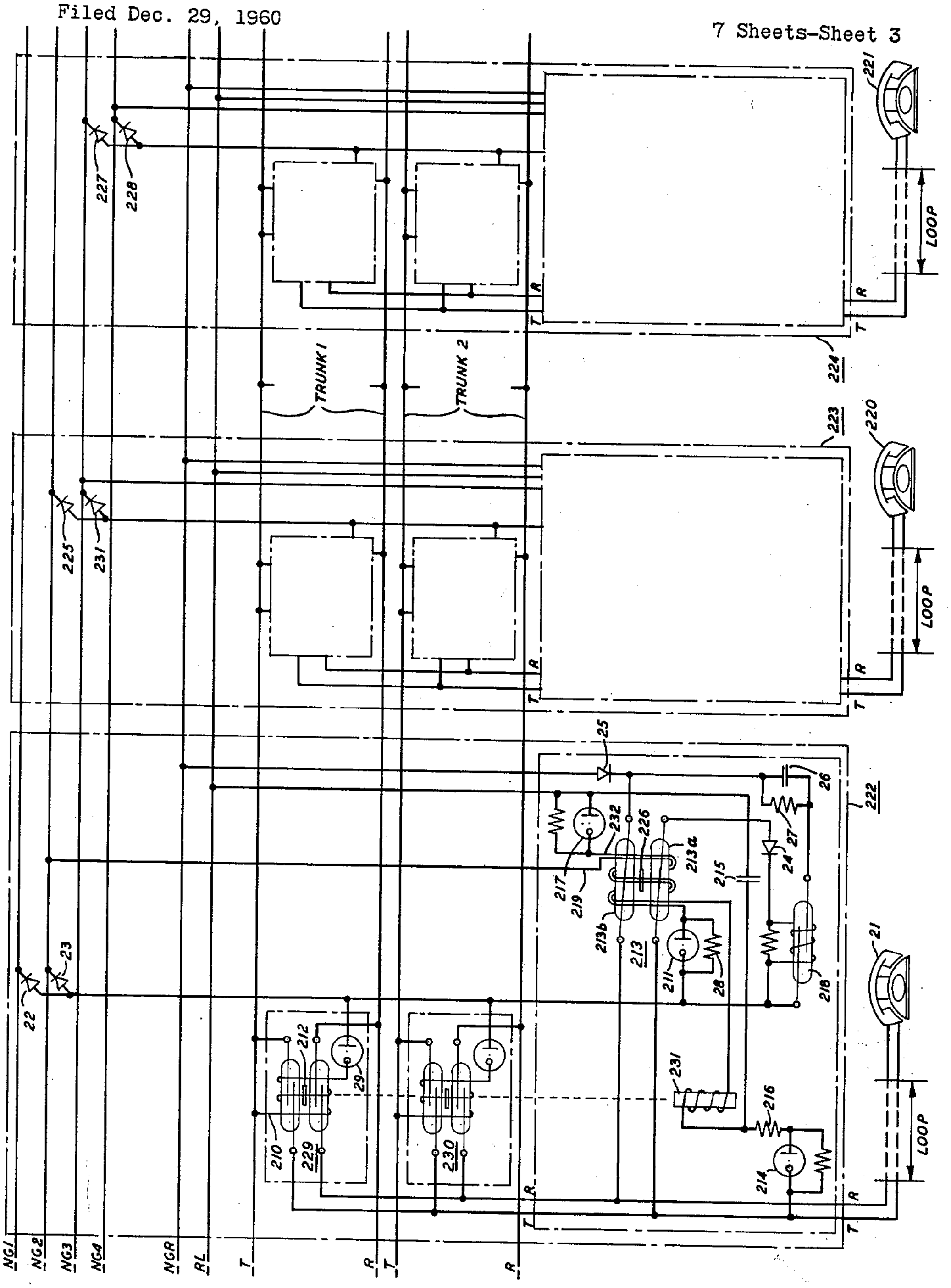
Figure 3:
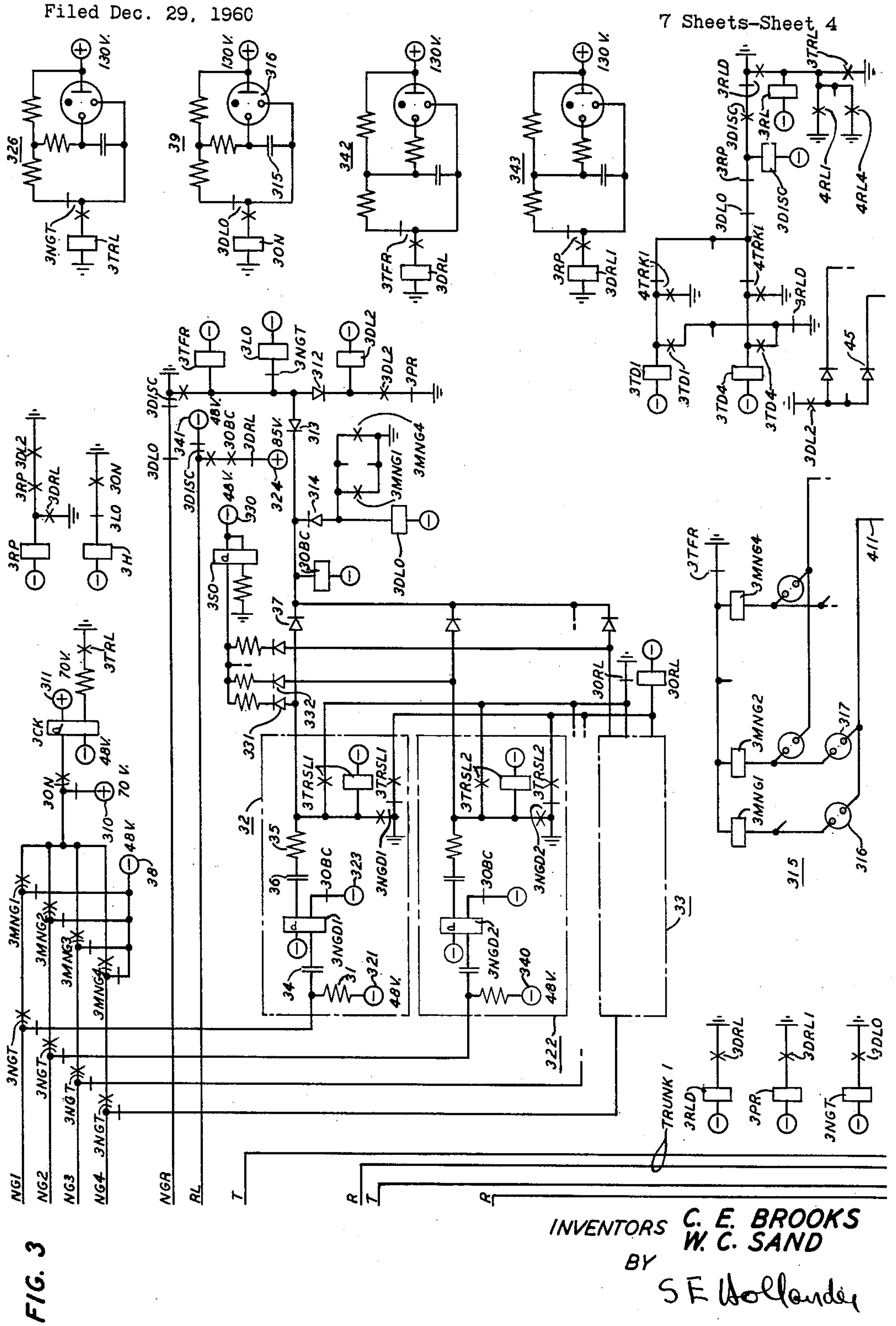
Figures 4, 5:
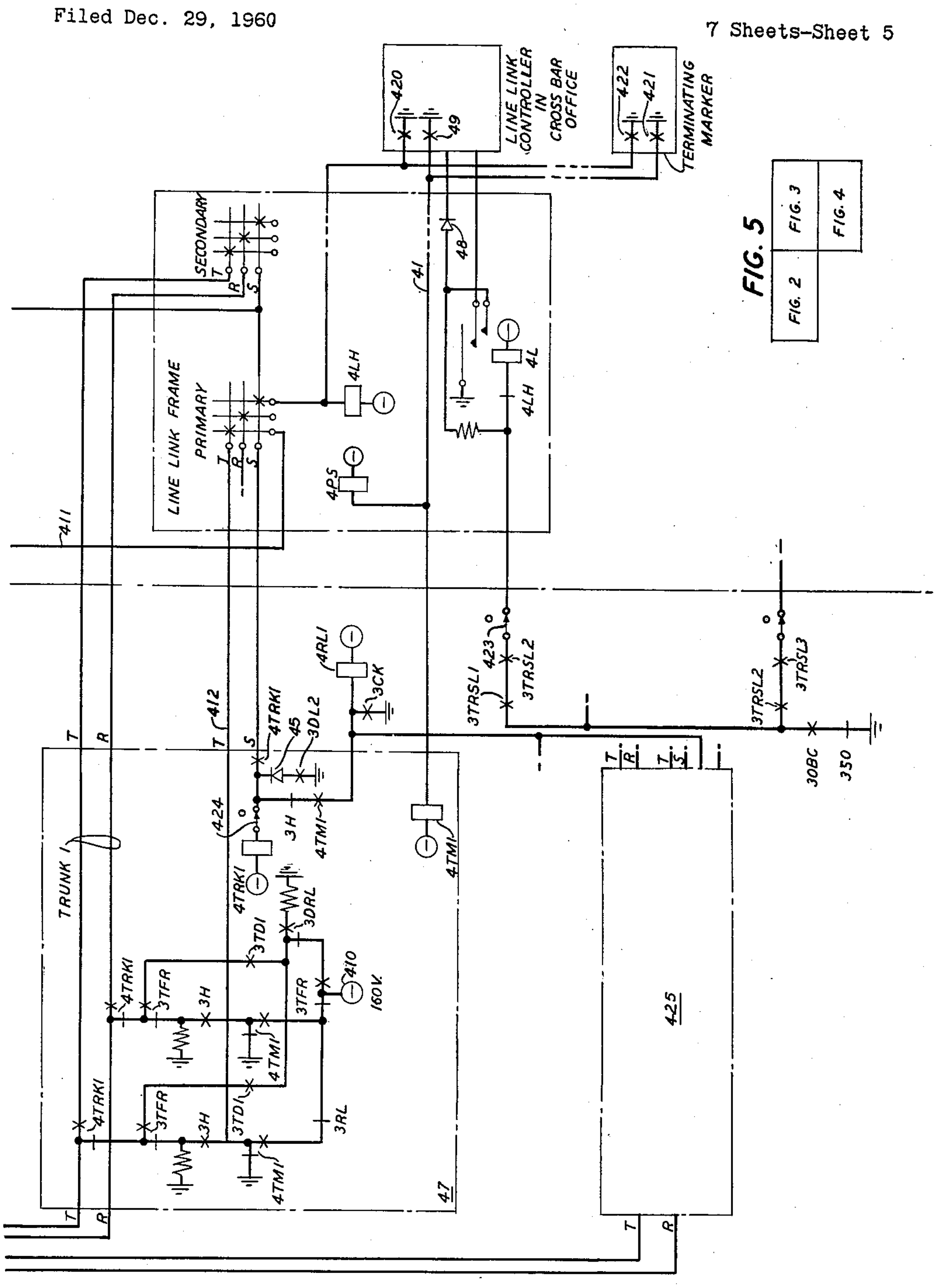
Figure 6:
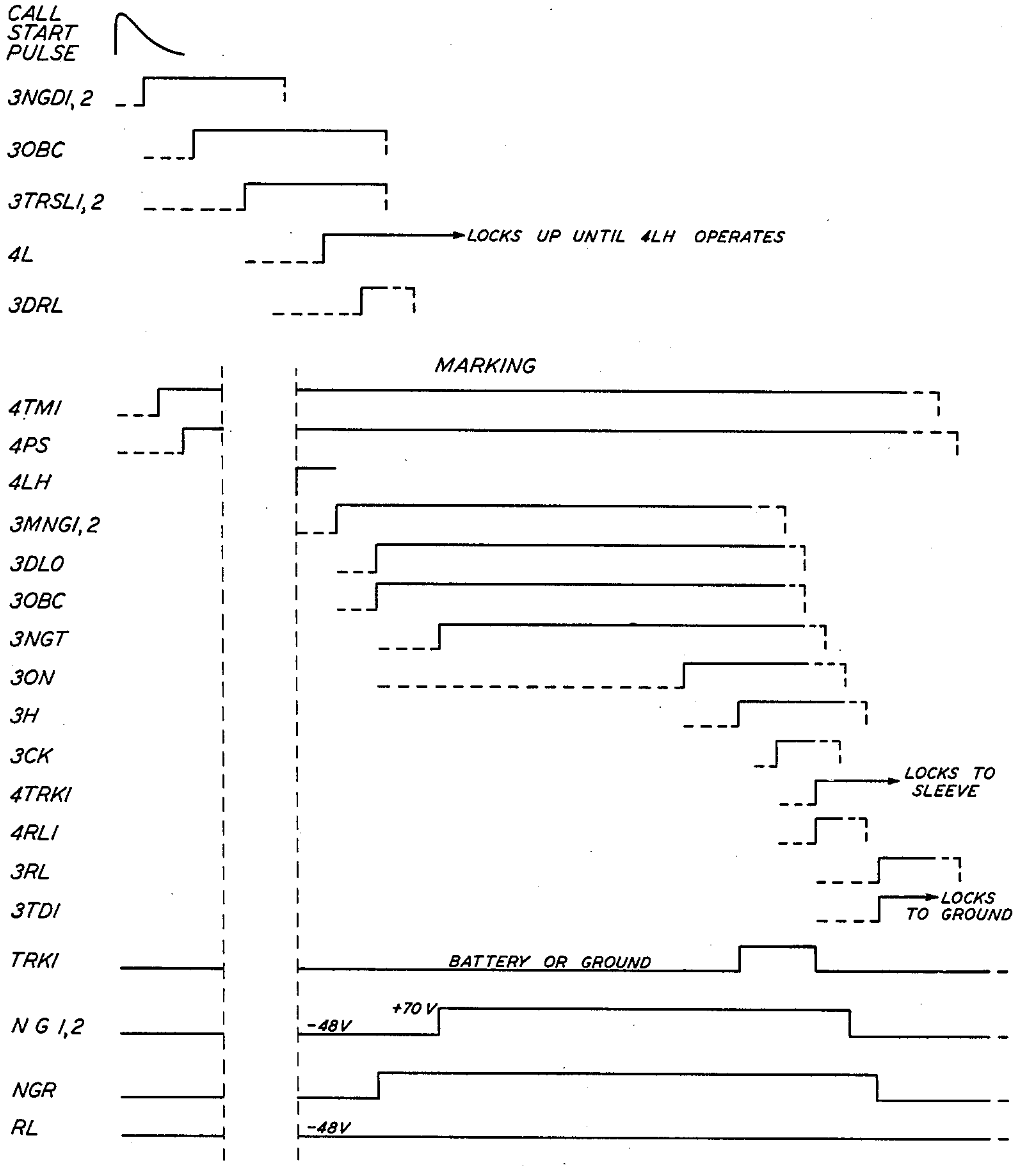
Figure 7:
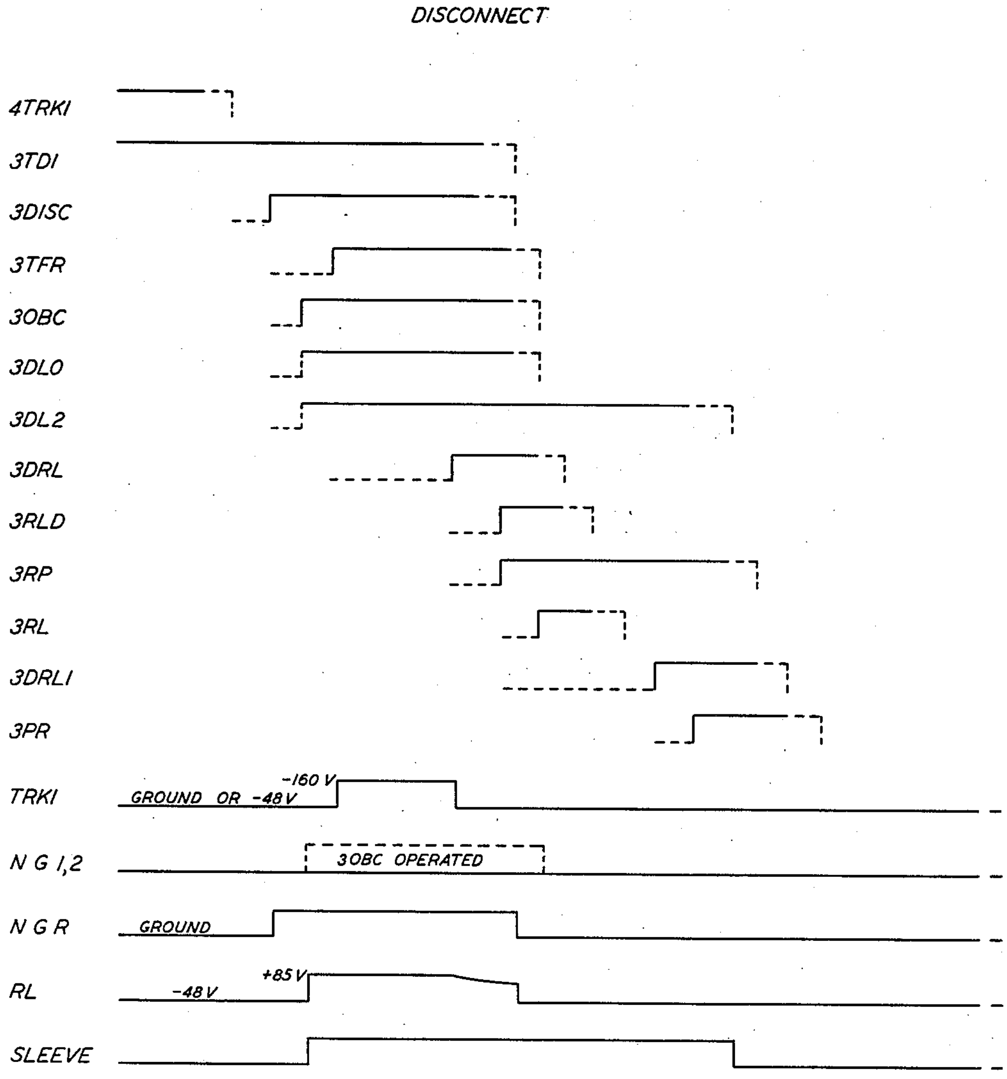

FIGS. 2–4 indicate the detailed structures of the equipment shown in outline form in FIGS. 1A and 1B wherein those structures have been added to or modified;

FIG. 5 shows the advantageous arrangement of FIGS. 2–4 for disclosing the present invention;

FIG. 6 shows a relay timing sequence for the call start function and the marking function; and FIG. 7 indicates the relay timing sequence for the disconnect function.

Appropriate and continuing reference to FIGS. 6 and 7 will be helpful in following the operation of the circuitry of FIGS. 2–4.

*General Description of Operation—Originating Call*

In accordance with a particular illustrative embodiment of the present invention a distributed line concentrator is shown in conjunction with a conventional No. 1 crossbar system. In essence, the structure of the No. 1 crossbar equipment is undisturbed. As a result, the present concentrator may be classified as a "universal" type. As shown in FIG. 1A, the concentrator includes a group of packages 120, 121 and 122. These packages are individual to the substations. An applique circuit at the central office, including control facilities 123 and trunk termination 47, is shown in outline form in FIG. 1A and in detail in FIGS. 3 and 4. The conventional No. 1 crossbar equipment is shown in dotted outline in the central office. It will be observed that the points of junction between the trunk and the central office equipment include the horizontal channel of the secondary crossbar switch in the line link frame. Although the line relays (conventional existing line relays) in the central office are not shown, it is understood that an individual line relay is provided in the central office unique to each concentrated substation line. This aspect is shown in detail at line relay 4L in FIG. 4.

The manner of entrance by the concentrator substation 124 into the central office on an originating call is via the line relay. In part, this has been done intentionally in order to preserve the structural integrity of the No. 1 crossbar office and to enhance the universality of the concentrator. To facilitate comprehension of the detailed description which follows, it will be useful here to briefly outline the advantageous manner in which the distributed line concentrator is operated in combination with the No. 1 crossbar system. For preservation of clarity only those aspects of the operation of the No. 1 crossbar system which are useful in understanding the present invention are included. For a comprehensive description of the operation of the No. 1 crossbar system in establishing an originating call, reference may be made to Patent No. 2,235,803 of W. W. Carpenter of March 18, 1941.

FIG. 1A is an outline diagram of the line concentrator apparatus as combined with the No. 1 crossbar office during an originating interoffice call from the concentrator. The line packages 120, 121 and 122 are each connected to two of the four number group leads NG1–NG4 in accordance with a code described further herein. Each of the packages is connected moreover to a common or number group return lead NGR and a common release lead RL.

A number of speech trunks, of which trunk 1 is shown as representative, are also connected to each of the line packages. The number group leads terminate at the central office in an applique circuit 123 which is used for identifying substations which are originating service requests and for other control operations explained further herein.

It is manifest from the drawing that the trunk conductors T and R extend from the horizontal level of a secondary crossbar switch in the line link frame.

In describing the operation of the invention it will be assumed that a party at substation 124 is seeking to effect a connection through the central office to a distant subscriber. When substation 124 goes off-hook, current flows through particular number group leads connected through line package 120 to substation 124 as explained in detail herein. Thus current flows through number group leads NG1 and NG2 to which substation 124 will, for the purposes of this illustration, be assumed to be connected. It will be noted, as shown in FIGS. 2–4, that the remaining packages are each connected to other unique combinations of the number group leads NG1–NG4 to specifically identify those packages and the lines (not shown) connected thereto.

The current which flows in number group leads NG1 and NG2 as a result of the off-hook condition at substation 124 is detected at the central office in applique circuit 123 as explained in detail herein and an identification of the calling substation is made through a translation of the number group leads carrying current.

Although not shown in FIG. 1A, it will be seen herein that package 120 includes equipment for generating a single relatively short duration high intensity identifying pulse on number group leads NG1 and NG2. This identifying pulse is detected in equipment shown in detail in FIG. 3 and indicated generally in FIG. 1A at applique circuit 123. In addition, applique circuit 123 includes facilities responsive when a number of service request pulses are simultaneously received from different line packages to preclude identification of any of the service requesting lines.

To continue with the operation the result of the identification of the calling line is the operation of a line relay (not shown in FIG. 1 but shown in detail in FIG. 4) which is uniquely associated with the calling substation line.

In response to the operation of the line relay, the line group controller 130 and the sender link controller 131 are energized. These controller circuits select district junctor 133, sender link 134 and sender 135 and operate the necessary select and hold magnets to establish these connections. As indicated above, detailed descriptions of these operations are disclosed in Patent No. 2,235,803.

After the operation of the line relay, arrangements are undertaken in circuit 123 to effect a connection to the substation by applying a marking potential to the number group leads NG1 and NG2 unique to that substation and by simultaneously applying a marking potential to the tip conductor of the selected trunk. A crosspoint 126 is energized by the marking potentials as explained herein, and a path is extended from substation 124 through crosspoint 126, trunk 1, trunk termination 47 to the secondary crossbar switch of the line link frame 143 at the central office.

When the subscriber sender 135 is connected to the line it transmits dial tone to the calling subscriber and accepts and records the digits dialed at substation 124.

The subscriber sender 135 has access to an originating marker connector 137 to select an idle originating marker 136 which then receives the information dialed by the calling subscriber into the subscriber sender 135.

In accordance with routine procedure, the marker determines from the called office code the location of the corresponding trunk group on the output of the office link frame 138 and selects an idle trunk 125 in the proper group and then establishes paths through the district link and office link frames for connecting the district junctor 133 to the selected outgoing trunk 125. When these functions have been performed the marker operates the appropriate select and hold magnets to close the crosspoints and establish the connection to outgoing trunk 125. The sender 135 then transmits the called line number to the terminating office and the connection is extended to the calling party. This completes the connection on an originating call from a substation 124 through the distributed concentrator and the No. 1 crossbar office to the called terminating office. For perspective in analyzing the distinction between lines conventionally connected to the No. 1 crossbar office and the manner in which a concentrated line is given access to the office, the manner in which a direct connected or conventional substation would have been connected to the line link frame is shown in dotted outline. Thus a conventional line would extend from the tip and ring conductors on the verticals on the line link frame to substation 128 (the prior art direct connected substation line).

In the present invention the tip and ring vertical conductors are not used for connection to the line and do not extend into the field. As will be shown herein, a conductor connected to the tip vertical of the primary switch is used for identification purposes but that conductor remains wholly within the central office and is merely extended to applique unit 123 as shown. As a departure from previous practice, the present arrangement contemplates that the tip and ring horizontals T and R on the secondary of the line link frame are extended out to the field through termination 47 and are connectable to each of the line packages as trunk 1.

*General Description of Operation—Terminating Call*

Referring now to FIG. 1B, it will be assumed that a call is to be extended from the incoming trunk 129 through the No. 1 crossbar office and the distributed concentrator to substation 124.

It will be noted that incoming trunk 129 terminates at incoming trunk circuit 140. The incoming trunk circuits appear on the horizontals of the incoming link frame 141 as shown and also on the horizontals of the terminating sender link frame 142. The incoming link frame 141 and the line link frame 143 collectively form the terminating network for completing the call through the crossbar office.

The sender link controller circuit 144 establishes a path from the incoming trunk 140 to a terminating sender 145 through a crossbar link similar to that in which the line group controller circuit 130, discussed for FIG. 1A above, operates. When the terminating sender 145 is connected to the incoming trunk circuit 140 it receives the called line number over an interoffice trunk from the originating office and when the complete number has been registered connects to a terminating marker 146 through a terminating marker connector 147. The terminating sender 145 then transfers the record of the called substation number to the terminating marker 146 which, in turn, selects an idle path from incoming trunk circuit 140 to the line link horizontal to which termination 47 is connected. In essence, the No. 1 crossbar office is internally "unaware" of the fact that the called subscriber is not directly terminated at the office and seeks to establish a horizontal channel to the line. The marker determines on which line link frame the line is "located" through the number group connector 148 and connects to the desired line link frame through the line choice connector 159. The originating office sender is then released when the record of the called number has been passed to the terminating sender 145. The marker makes a called line busy test as on a nonconcentrator call and if substation 124 is idle (sleeve conductor is at minus 48 volts) the marker extends the incoming trunk circuit through the incoming link 149 and line junctor 150 to the horizontal on which trunk 1 is terminated. Equipment in terminating circuit 47 and applique circuit 123 are then actuated to uniquely identify the number group leads associated with called substation 124 and to apply marking potentials to the number group leads and to the tip conductor of trunk 1 to operate crosspoint 126. The incoming trunk circuit 140 applies ringing current to the called line and when the call has been answered maintains supervision in the usual manner.

Substation 128 again shows in dotted outline the manner in which a substation would be connected to the line link frame 143 in accordance with prior art procedures. Here again, the extension of the horizontal level of the secondary of the line link frame as trunk 1, in effect, extends the crosspoints into the field where they appear in a multiplicity of physically separated areas contiguous to the individual substations such as crosspoint 126 at substation 124.

Although not shown in FIGS. 1A and 1B the package circuitry 120 shown in FIG. 2 as explained in detail herein includes facilities for remaining permanently "latched" when either operated or released—thereby obviating the need for continuous holding current.

For a detailed description of the operation of the equipment shown in FIG. 1B in "dot-dash" outline, reference may be made to Patent 2,089,921 of W. W. Carpenter of August 10, 1937.

*General Description of Major Components*

Referring now to FIG. 2 a group of substations 21, 220 and 221 are shown. Line packages 222, 223 and 224 individual to these substations are indicated for connecting the substations to the central office. For purposes of clarity of description, the number of substations, trunks and packages, etc., have all been minimized although it is apparent that the principles involved in the operation of a greater number of substations and trunks is identical.

Four number group conductors NG1–NG4 extend from the central office of FIGS. 3 and 4 and are connected to each of the substations 21, 220 and 221 in accordance with a prearranged code. In this manner each substation and line package is connected to an individual and distinct set of number group leads over diodes 22, 23, 225, 231, 227 and 228. A common return conductor NGR is connected to each of the line packages as is a common disconnect or release conductor RL.

Each of the substations, for example substation 21, is connectable to each of the trunks over a balanced path including, in the case of trunk 1, the upper and lower contacts of relay 229. This establishes a metallic connection between the tip conductor T of the loop and the tip conductor T of the trunk and the ring conductor R of the loop and the ring conductor R of the trunk. A separate pair of reed crosspoints is available for connecting the substation to each of the trunks to which it has access. Thus, the reed contacts of relay 230 are used for connecting substation 21 to the tip and ring contacts of trunk 2. Each of the pairs of contacts of relays 229, 230, etc. is equipped with permanent magnetic latching facilities shown, for example, at magnet 212 which are effective in maintaining the reeds continuously in the position to which they are operated by winding 210 and coil 231.

This is advantageous in the case of a remote concentrator since the energy expended in operating the crosspoint 229 to connect substation 21 to trunk 1 is only momentary. Thereafter, the crosspoint contacts of relay 220 will remain closed indefinitely without further power drain.

Release coil 231 is common to all of the pairs of reed relays associated with a particular line. Coil 231 is excited only when it is necessary to release the contacts in a crosspoint at which time (as indicated by the dotted vertical line in FIG. 2) the coil exerts an influence on all of the reed crosspoints collectively thereby opening any crosspoints previously operated. A further pair of reed elements which are individual to the line package are shown at 213*a* and 213*b*. These include contacts which are used in conjunction with the operation or release of crosspoints 229, 230, etc. and serve, at least in part, in the role of the traditional cut-off relay. Thus, when crosspoint 229 is operated, as described in detail herein, to connect substation 21 to trunk 1, relay 213 is actuated to divorce substation 21 from its connection to the number group conductors NG1, NG2 and NGR. Under these conditions, substation 21 is granted access to the central office over a "clean" metallic path, that is, a path which is free of bridging or shunting impedances. Relay 213 is hereinafter sometimes referred to as the number group relay in view of its role in connecting and disconnecting substation 21 from the number group and number group return conductors. It will be noted that relay 213 also is equipped with permanent magnet latching features as shown by magnet 226.

Another major component in the package circuit 222 includes call start relay 218. This relay is also a reed relay though it differs from the others since no latching facilities are included. The function of the call start relay is to deliver a relatively short duration pulse on the number group conductors connected to a particular substation in response to a service request condition thereon. As explained in detail herein, capacitor 26 connected to call start relay 218 is utilized to control the pulse duration as a function of the charge time of the capacitor. Thus, although call start relay 218 remains operated, the current delivered over the number group conductors by capacitor 26 is only momentary.

Although line package 222 has been shown in detail and packages 223 and 224 are shown in outline form, it is understood that the latter packages contain identical equipment.

At the applique circuit in the central office the number group conductors individually terminate in number group detector relay 3NGD1–3NGD4. The latter relays are responsive to pulses received on the number group conductors to operate translation relays 3TRSL1–3TRSL4, respectively. The contacts of the latter relays, in turn, are connected in a coded arrangement individual to each of the substation lines for operating a line relay uniquely representative of the substation line. In the embodiment the contacts of relays 3TRSL1 and 3TRSL2 operate relay 4L, the same line relay to which substation 21 would have been connected if it were directly connected to the central office.

In this respect line relay 4L is representative of the remaining line relays, not shown, which are the conventional existing line relays in the No. 1 crossbar central office. The manner of connection of the contacts of translation relays 3TRSL1 and 3TRSL2 to the existing line relay 4L is shown in part to indicate the universality of the instant invention. Since the applique circuit connects to the existing line relay the degree of disruption of existing No. 1 crossbar equipment to provide compatible operation with the instant concentrator is minimal.

In addition, the line relay, once operated, presents a unique mark to the central office equipment to initiate routine prior art functions in the central office to extend a connection to the horizontal of the crossbar switch on the line link frame to which the central office "believes" the calling line to be connected.

Instead, as shown in FIGS. 1A and 1B, the calling line is not connected to the vertical on the primary crossbar switch and instead the horizontal channel of the secondary is extended into the field as a concentrator trunk.

Here again, a further desirable feature of the instant invention is manifested. The linkage between the central office equipment and the concentrator is such that when the central office proceeds routinely to establish a connection to the horizontal channel and operates the select magnet 4PS and line hold magnet 4LH in accordance with the above-referred-to patents, equipment in the applique circuit responsive to these routine operations is effective to extend the horizontal channel into the field and to effectuate a vertical connection at the remote location between the trunk and the appropriate line package. It will be seen in the following detailed descriptions that the intelligence necessary for performing the latter operation is vested in the concentrator equipment rather than the central office equipment—again indicating the non-interference with existing central office equipment.

A trunk termination circuit 47 is shown for connecting trunk 1 to the horizontal level of the secondary cross-bar switch in the line link frame. Termination 425 shown in outline form serves an identical purpose with respect to trunk 2.

Other essential components of the applique circuit include the number group translator 315 which is shown illustratively as a gas tube translator and functions through a connection to the tip vertical on the primary cross-bar switch of the line link frame. Since, as indicated heretofore in the description of FIGS. 1A and 1B, the vertical path on the primary crossbar switch is individual to a substation line, the tip conductor of the vertical is uniquely representative of the line identification and may be utilized to obtain a translation of the line identification. In this respect it will be observed that at least two translations are performed in the applique circuit and they serve to relate the identity of the calling substation in the concentrator (concentrator number) to its corresponding identity in the central office (No. 1 crossbar equipment number). Thus, the tip crosspoint conductor of the primary crossbar switch is uniquely representative of substation 21 in the No. 1 crossbar office and indicates the equipment number of substation 21 in the No. 1 crossbar office. Translator 315 performs a translation whenever necessary between the equipment number of substation 21 as indicated by its position in the line link frame to the "concentrator number"—i.e., the coded arrangement by which substation 21 is connected to code conductors NG1–NG4. In this respect the operation of relays 3MNG1 and 3MNG2 is related to the connection of line package 222 to number group conductors NG1 and NG2.

A translation which is equivalent to a translation in the opposite direction is performed by the translation relays 3TRSL1–3TRSL4. These relays are responsive to the concentrator number of substation 21 to identify the equivalent equipment number in the No. 1 crossbar office.

It will be observed that although four number group conductors are shown as illustrative a greater number may be utilized, for example eight conductors, and connections to the line package may be on a three-out-of-eight basis instead of a two-out-of-four basis, as shown, thereby affording a larger number of possible combinations.

A further significant component in the applique circuit is shown at relay 3SO. This relay is connected over its lower winding to a biasing supply from potential source 330. The upper winding of the relay is connected over individual diodes 331, 332, etc. to reach of the number group detector relays 3NGD—. Current flow through the number group detector relays in response to a service request pulse generated by call start relay 218 will produce a proportional current through diodes 331, 332, etc. and the upper winding of relay 3SO. This current is designed to oppose the current through the lower winding. Moreover, in the illustrative embodiment current flow through two of the diodes 331, 332 is collectively insufficient to overcome the biasing current through the lower winding and operate relay 3SO. However, current flow through a number of diodes greater than two is designed to operate relay 3SO thereby precluding operation of any of the line relays, such as relay 4L, in view of the contacts of relay 3SO in series with the operating paths of the relays. This is a significant feature as will be explained herein with respect to the occurrence of simultaneous service request calls. Thus, if substations 21 and 220 should go off-hook precisely simultaneously, no spurious identification can be made since the reaction at the applique circuit is, in effect, to reject both service requests.

In this respect it will be observed from the detailed description which follows that both substations will be denied access to the trunks until one of the parties "flashes" his switchhook contacts thereby releasing and reoperating call start relay 218 to generate a fresh service request pulse. As indicated herein, the fact that substation 220 remains connected to the number group conductors during the "flashing" sequence is of no consequence. Moreover, also as indicated in detail herein, the remaining substation 220 will thereafter be granted access to an idle trunk, even though the subscriber thereat takes no further action and does not "flash" his own switchhook. Briefly, the latter function is accomplished by a regeneration technique explained herein which is effective to open the number group return conductor NGR at the contacts of relays 3DLO and 3DISC during the setting up of a connection and a disconnect operation, respectively. Interruption of the number group return conductor NGR momentarily releases the call start relay associated with substation 233 to regenerate a further service request for that substation.

A trouble timing circuit 326 in the applique is used when a crosspoint is, for any reason, not operated within a predetermined period of time to automatically initiate a release function thereby freeing the concentrator applique equipment for other calls.

It will be observed that the applique circuit is equipped with arrangements for precluding continued unwarranted seizure of a concentrator trunk by a substation line having a fault or permanent condition thereon. This function will be explained in detail herein and is shown symbolically by manual switch 424 in series with relay 4TRK1 and manual switch 423 associated with line relay 4L individual to substation 21. It will be observed herein that the operation of manual switch 423 blocks out further seizure of a concentrator trunk by a faulted line whereas the momentary actuation of switch 424 immediately releases concentrator trunk 1 for access by legitimate service request calls.

Having thus described the components of the invention a description of the operation of the equipment follows.

*Detailed Description—Originating Call*

It will be assumed for illustrative purposes that a subscriber at substation 21 is initiating a service request. When the substation goes off-hook, the switchhook contacts (not shown) are closed in subset 21 and a path is completed over the loop from negative battery at source 321, resistance 31, contacts of relay 3NGT, number group conductor NG1 to diode 22. A similar path may be traced from negative battery 340 in number group detector 322 connected to number group conductor NG2 over the contacts of relay 3NTG and to diode 23. From the junction of the anodes of diodes 22 and 23, the circuit is further extended to the winding of reed relay 218, diode 24, contacts of reed element 213A, tip conductor T of the subscriber's loop, subset 21, ring conductor R of the subscriber's loop, contacts of element 213B, diode 25, number group return conductor NGR, contacts of relays 3DLO, 3DISC to ground in the applique circuit at the central office. This path, when completed, results in the operation of call start relay 218, in view of the current flow through the winding thereof.

After the contacts of call start relay 218 are closed, a pulse of current is delivered through capacitor 26, in view of the sudden low impedance path through diode 25, capacitor 26, and the contacts of relay 218 to diodes 22 and 23. As capacitor 26 charges, a current pulse is applied to number group conductors NG1 and NG2 to which diodes 22 and 23 are connected. Moreover, the current pulse is delivered through the contacts of relay 3NGT and capacitor 34, lower winding of relay 3NGD1, contacts of relay 30BC to source 323. Relay 3NGD1, the number group detector relay, operates. In a similar manner, number group detector relay 3NGD2 operates as a result of the current pulse over number group conductor NG2. In essence, the information which has been transmitted to the central office represents the fact that a combination of number group conductors (NG1 and NG2) unique to the calling substation 21 has been energized. This intelligence (concentrator number) is adequate to permit identification of the calling substation at the central office.

Operation of relays 3NGD1 and 3NGD2 causes the operation of translation relays 3TRSL1 in number group detector 32 and 3TRSL2 in number group detector 322 over the contacts of relays 3NGD1 and 3NGD2, respectively. A path is now available to the upper winding of relay 3NGD1 over the contacts of relay 3NGD1, including resistance 35 and capacitor 36. The latter RC combination comprises a time delay release circuit in which the current flow through resistance 35 and the upper winding of relay 3NGD1 decreases as capacitor 36 charges until polarized relay 3NGD1 releases. It will be observed that the current flow through the lower winding of relay 3NGD1 is in pulse form and has also terminated. Relay 3NGD2 reacts similarly.

The operation of the translation relays 3TRSL1 and 3TRSL2 are, in part, controlled by relay 30RL. Thus, relay 3TRSL1, for example, would ordinarily release after the release of the number group detector relay 3NGD1. However, the contacts of relay 30RL provide an additional holding path over the contacts of relay 3TRSL1 until relay 30RL is operated. Thus, the effect of relay 30RL is to increase the operated time of relay 3TRSL1 by the time required to operate relay 30RL.

Relay 30BC operates over a path including the contacts of relay 3NGD1 and diode 37. A similar path extends over the contacts of relay 3NGD2. The contacts of relay 30BC interrupt the operating path through the lower winding of relay 3NGD1 to preclude response to any further service request pulses received immediately subsequent to those generated by substation 21.

After the operation of translating relays 3TRSL1 and 3TRSL2, a unique path is completed for the operation of line relay 4L which is the existing conventional line relay in the No. 1 crossbar telephone office individual to substation 21. The path for the operation of relay 4L may be traced from ground, contacts of relays 3SO, 30BC, 3TRSL1, 3TRSL2, switch 423, contacts of hold magnet 4LH, winding of relay 4L to negative battery. Operation of relay 4L completes a hold path for itself over its own contacts and the contacts of relay 4LH. In addition, a ground or start signal is delivered to the controller circuit in the crossbar office over diode 48.

In response to the operation of line relay 4L, the No. 1 crossbar system is operated in the routine manner outlined in FIG. 1A. Thus, the line group controller 130 and a sender link controller 131 are energized to select an idle district junctor, sender link and sender and the necessary select and hold magnets to establish the connection are operated.

When the line link primary select magnet 4PS is operated in the conventional manner (as disclosed in the above-referred-to patents) relay 4TM1 is operated in parallel therewith. For clarity of presentation the operation in shown symbolically by actuation of contacts 49 in the controller circuit in the crossbar office.

At this time hold magnet 4LH is also operated by suitable apparatus in the No. 1 crossbar office shown here symbolically by the operation of contacts 420 in the control circuit.

*Marking of Number Group Conductors*

Operation of relay 4TM1 which is unique to the selected horizontal group (and trunk) causes a marking potential to be applied to the number group translator 315 over a path from potential source 410, contacts of relays 3TFR, 3RL, 4TM1, tip conductor T (412) of the link, tip crosspoints of the primary switch, conductor 411, gas tubes 316 and 317 in parallel, relays 3MNG1 and 3MNG2, contacts of relay 3TFR to ground. This results in the operation of relays 3MNG1 and 3MNG2, to prepare to apply a charging potential from source 310 to number group conductors NG1 and NG2 uniquely representative of substation 21. Thus a path may be traced from source 310, contacts of relay 30N, contacts of relays 3MNG1 and 3MNG2 in parallel, to the contacts of relay 3NGT connected to number group conductors NG1 and NG2.

In the interim, relay 3DLO is operated over the contacts of relays 3MNG1 and 3MNG2 (the latter not shown). Operation of relay 3DLO causes the operation of relay 3NGT over an obvoius path. The latter relays extend the charging potential to conductors NG1 and NG2. Operation of relay 3DLO also initiates the operation of a time delay circuit for the operation of relay 30N.

The 70-volt potential, from source 310, may now be traced to diodes 22 and 23 at the remote package individual to substation 21. Moreover, a negative 48-volt potential from source 38 is applied over the contacts of unoperated relays 3MNG— to all other number group conductors.

The potential of 70 volts may further be traced from number group conductor NG2 through winding 219 of relay 213, resistance 28, to gas tube 29. The purpose of the charging potential from source 310 is to establish a stable 70-volt potential in the number group conductors prior to marking.

Relay 30N, meanwhile, operates at the contacts of relay 3DLO, when capacitor 315 charges to a sufficient level to ionize the control gap and in turn cause ionization of the main gap of tube 316. Operation of relay 30N causes the transfer of the 70-volt marking potential source from source 310 to source 311 through the upper winding of relay 3CK. In addition, the contacts of relay 30N complete a path including the contacts of relay 3LO for the operation of relay 3H.

The latter relay in operating, results in the connection of negative 160-volt potential to tip and ring conductors T and R of trunk 1. This path may be traced in the case of the tip conductor T from negative 160 volts at source 410, contacts of relays 3TFR, 3RL, 4TM1, 3H, 3TFR, 4TRK1, to the tip conductor T of trunk 1. A path may similarly be traced to the ring conductor over the contacts of relays 3TFR, 4TM1, 3H, 3TFR and 4TRK1. The negative 160-volt potential applied to the tip conductor of trunk 1 extends through winding 210 of crosspoint relay 229 to the left electrode of gas tube 29. As indicated above the other electrode of tube 29 is subjected to a positive 70-volt potential over resistance 28 and winding 219 via conductor NG2. This produces a substantially 230-volt potential across gas tube 29, which conducts. A negative-going pulse is, therefore, applied to the cathode of gas tube 211 of substantially minus 90 volts (i.e. minus 160 volts, less a 70-volt drop across gas tube 29). Since the anode of tube 211 was previously shown to be at a positive 70-volt potential over winding 219, tube 211 also fires.

A path is now provided for the operation of relay 3CK, which may be traced from plus 70 volts at source 311, upper winding of relay 3CK, contacts of relays 30N, 3MNG2, 3NGT, number group conductor NG2, winding 219, tube 211, tube 29, winding 210, tip conductor T of trunk 1, contacts of relays 4TRK1, 3TFR, 3H, 4TM1, 3RL, 3TFR to negative 160 volts at source 410. As the current develops in windings 210 and 219, the crosspoint contacts of relay 229 are closed and latched under the influence of permanent magnet 212 and the contacts of relay 213, previously closed, are now opened as a result of current flow through winding 219.

Closure of the contacts of relay 229 provides a connection between substation 21 and the tip and ring conductors of trunk 1. Moreover, the substation circuit is now disconnected from the number group conductors and the number group return lead NGR as a result of the opening of the contacts of elements 213A, 213B, thereby providing a "clean" tip and ring connection from the remote circuit to the central office.

At the central office, relay 3CK operates over its upper winding when the current through windings 210 and 219 builds to a sufficient level. Operation of relay 3CK completes a path for the operation of relay 4TRK1 from ground, contacts of relays 3CK, 4TM1, 3H, switch 424, winding of relay 4TRK1 to negative battery.

Operation of relay 4TRK1 transfers the tip and ring conductors of trunk 1 to the tip and ring of the link connected to the secondary of the crossbar switch in the line link frame and in addition divorces the trunk tip and ring conductors from the applique circuitry. Relay 4TRK1 locks operated over its own contacts, switch 424 and the sleeve link S to the ground applied to the sleeve conductor in the controller circuit.

This completes the connection to a calling substation on an originating call and the subscriber will ultimately be connected to a subscriber sender in the No. 1 crossbar office, in accordance with routine procedure generally described for FIG. 1A above. The subscriber sender transmits dial tone to the calling subscriber.

When the called party's directory number is registered in the central office, in response to dialed information from substation 21, routine control actions are initiated in the No. 1 office to effect a connection to the called party.

*Detailed Description—Terminating Call*

It will now be assumed that a terminating call is being initiated to substation 21.

The terminating marker, in establishing an incoming call to the called line (as discussed above for FIG. 1B), selects an idle channel through the crossbar switches to the horizontal group of the line link frame on which the called line would have appeared if it were directly connected to the central office. (See FIG. 1B.) The primary select magnet 4PS and line hold magnet 4LH, unique to substation 21, are operated in a conventional manner to enable circuits, described further herein, to mark the proper line at the concentrator.

More specifically, the terminating marker, after making a directory to equipment number translation, extends a ground connection (shown symbolically by actuation of contacts 421) to operate select magnet 4PS on the line link frame (and applique relay 4TM1).

Another ground connection is extended over contacts 422 to operate the line hold magnet 4LH. Thus far the operation is routine in the sense that the central office "believes" that it is completing the connection since the called line is ordinarily connected to a vertical on the primary crossbar switch. Instead, as demonstrated above, the horizontal channel of the secondary crossbar switch is extended into the field as a trunk and the vertical connection is made through reed relays in the remote location. Specifically, when the vertical magnet 4LH is operated a negative 160-volt potential is applied from source 410 to the number group translator 315 over a path including contacts of relays 3TFR, 3RL, 4TM1, tip conductor 412, tip contacts of the primary crossbar switch, conductor 411 to diodes 316 and 317, which ionize and permit the operation of relays 3MNG1 and 3MNG2 over the contacts of relay 3TFR.

Operation of relays 3MNG1 and 3MNG2 causes the operation of relay 3DLO over an obvious path. A marking operation is then executed in a manner similar to that described above for an originating call. As a result, the contacts of relay 229 are operated to connect trunk 1 to substation 21 and the contacts of relay 213 are opened. When crosspoint 229 is closed, current flow through the number group conductors causes the operation of relay 3CK in the manner disclosed above for an originating call. Operation of relay 3CK results in the operation of relays 4RL1 and 4TRK1. Relay 4RL1 causes the operation of relay 3RL which removes the negative 160-volt potential from the number group translator 315.

Subsequent operations thereafter are similar to those described above for an originating call. Since this is a terminating call however, ringing current is applied in the conventional manner from the No. 1 crossbar equipment.

*Detailed Description—Disconnect Operation*

When the conversation is completed, the release cycle is initiated when the subscribed returns the receiver to its cradle and the switchhook contacts are opened. Conventional supervisory equipment in the No. 1 crossbar office (trunk supervisory relay—not shown) senses the decrease in current flow in the trunk circuit and initiates apparatus which routinely releases the connection by removing the ground condition from the sleeve conductor S extending through the primary and secondary crossbar switches. As a result, relay 4TRK1 releases in view of the opening of the holding ground.

When relay 4TRK1 releases, a circuit is completed for the operation of disconnect relay 3DISC over a path from ground, contacts of relay 3RLD, 3TD1 (previously operated over the contacts of relay 4TRK1), 4TRK1, 3DLO, 3RP, winding of relay 3DISC to negative battery. Relay 3DISC locks operated over its own contacts and the contacts of relay 3RLD to ground. Operation of relay 3DISC completes a path for operation of relay 3TFR over an obvious circuit. In addition, relays 3LO and 3DL2 are operated over the same path including, in the case of relay 3LO, the contacts of relay 3NGT and, in the case of relay 3DL2, diode 312. At this time, the contacts of relay 3DISC divorce the number group return lead NGR from ground. The significance of this function in opening the number group return lead and thereby releasing any call start relay similar to relay 218 will be elaborated herein.

Relay 3DL2, in operating, locks to ground over its own contacts and the contacts of relay 3PR. In addition, relay 3DL2 applies a ground potential over its own contacts and diode 45 to the sleeve conductor. This ground condition on the sleeve prevents any incoming calls from being set up before the disconnect circuit has completed its function. It also prevents any other trunks from disconnecting until after this disconnect in progress has completed its cycle.

At indicated above, relay 3TFR has operated at the contacts of relay 3DISC. This operation prevents the actuation of any relays 3MNG—in view of the contacts of relay 3TFR in series therewith.

Moreover, relay 3TFR applies negative 160-volt potential to the tip and ring conductors of trunk 1 over a path from source 410, contacts of relays 3TFR, 3DRL, 3TD1, 3TFR, 4TRK1 to the ring conductor R. A similar path may be traced to the tip conductor T. Continuing over the tip conductor T of the trunk, the negative 160-volt potential extends through the upper contacts of relay 229 to the cathode of tube 214.

After the operation of relay 3DISC, negative 48-volt potential is removed from release conductor RL at source 341 and instead a positive 85-volt potential is applied to that conductor from source 324 over the contacts of relays 3DRL, 30BC and 3DISC.

Relay 3DRL is operated by timing circuit 342 a predetermined interval after the operation of relay 3TFR when the capacitor in timing circuit 342 charges to a sufficient level to permit conduction in the gas tube. When relay 3DRL operates, the positive 85-volt potential previously referred to is removed from release conductor RL at the contacts of relay 3DRL.

In the interim, however, as a result of the application of the positive potential from source 324 over conductor RL, a path is available over capacitor 215 and resistance 216 to the anode of tube 214. Since as indicated above, a negative 160-volt potential is applied to the cathode, tube 214 ionizes and conducts. As a result, current flows through capacitor 215 to charge that capacitor to a voltage approaching 175 volts. This difference in potential is attributable to the positive 85-volt potential on conductor RL, and the negative 90-volt potential from tube 214 (minus 160 volts on the tip conductor T less the 70-volt drop through tube 214). When capacitor 215 charges to a sufficient level, to ionize tube 217, the tube conducts. It is seen that tube 217 has its cathode conducted through winding 232, winding of coil 231 to the left electrode of capacitor 215. The anode of tube 217 is connected to the other side of the capacitor.

When tube 217 conducts, a path is available through the winding of coil 231 which includes the tip conductor T, upper contacts of relay 229, tube 214, resistance 216, winding of coil 231, winding 232, tube 217 to the release conductor RL. This path persists until the tip contacts of relay 229 (upper contacts) are opened as a result of current flow through coil 231 which serves to open any operated contacts in relays 229, 230, etc. However, another path for the continued energization of coil 231 and coil 232 exists even thereafter as capacitor 215 discharges over a circuit including coil 231, winding 232 and tube 217. Thus, coil 231 and relay 213 are energized by capacitor 215 for a further sufficient period to insure full release of all of the contacts of relays 220, 230, etc. and full closure of the contacts of elements 213A, 213B.

In view of the opening of the contacts of relays 229 and 230, etc., the line is separated from the trunk connection, and in view of the closure of the contacts of elements 213A, 213B, the line package is reconnected to the control conductors NG1, NG2 and NGR and restored to the normal service observing condition—whereby the number group conductors act as sensory devices.

In the interim, at the central office, when relay 3DRL operates as described above, relay 3RP operates over an obvious path and locks operated over its own contacts and the contacts of relay 3DL2. Relay 3RLD now operates over the contacts of relay 3DRL and relays 3DISC and 3TD1 release at the contacts of relay 3RLD. Relay 3TFR releases as the result of the release of relay 3DISC.

Relay 3DRL1 operates a predetermined time interval after the operation of relay 3RP as determined by the parameters of timing circuit 343. Relay 3PR operates over the contacts of relay 3DRL1. Relay 3DL2 releases when relay 3PR operates. When relay 3DL2 releases the ground condition is removed from the sleeve horizontal associated with trunk 1 over diode 45 and the disconnect function is completed.

*Disabling Line Relay in Response to Permanent Condition on Loop*

In the event of a permanent line off-hook condition, a number of advantages of the instant invention may be invoked. Thus, it is desirable to avoid the condition in which a trunk to the central office is continuously seized in response to a line off-hook condition of a "permanent" nature, either intentionally or unintentionally. Since this condition is particularly crucial in the case of line concentrators, in view of the denial of access to the seized trunk by other lines with legitimate service requests, it is desirable to be able to preclude its continuance.

The arrangement for preventing continued seizure of a trunk by a line with a permanent condition thereon is shown in FIG. 4 symbolically by the use of switches 423 and 424.

When a line is "permanently" off-hook, the No. 1 crossbar office in a conventional manner ultimately transfers the line to an intercept or permanent signal holding trunk. This is done when the subscriber fails to dial information after a predetermined waiting period or "timeout" in the subscriber sender of the No. 1 crossbar office.

Ultimately, depending on the length of continuance of the off-hook condition, the situation is brought to the attention of maintenance personnel in a routine manner. In response to the permanent off-hook condition, the crossbar office and applique circuit have already extended a channel to the off-hook substation as described for a legitimate service request.

It will be assumed for illustrative purposes that trunk 1 has been marked to substation 21 in response to the permanent off-hook condition at that substation. To remedy the difficulty and prevent continued seizure of trunk 1, switch 424 is momentarily operated to release relay 4TRK1. Release of the relay 4TRK1 simulates to the applique circuit the initiation of a disconnect function in the same manner that the release of that relay as a result of the removal of ground condition from the sleeve lead would have done conventionally as described above. As a result, the disconnect function is initiated in the manner explained to release crosspoint 229 which joins the substation 21 to the tip and ring conductors of the trunk and to reclose number group relay 213.

The operation of switch 424 is only momentary in order that relay 4TRK1 may be reclosed in response to other legitimate calls.

However, prior to any actuation of switch 424, as described above, switch 423 is first opened. Switch 423 prevents relay 4L from being reoperated in response to a further "service request" from substation 21. In fact, continued "service requests" will emanate from substation 21 as a result of the regeneration technique explained herein although a trunk cannot be seized since relay 4L cannot be operated. This prevents initiation of a connection function in the controller circuit of the crossbar office. Thus, further spurious "service requests," whenever they appear from substation 21, will be ignored.

Although the operation of switches 424 and 423 are shown symbolically, it is understood that the manner in which the trunk relay 4TRK1 may be released may take other forms including equipment responsive to the transfer of trunk 1 to the permanent condition trunk in the central office, timing arrangements, etc. In addition, it is understood that the operation of the line relay 4L may be blocked by other means including mechanical means.

*Regeneration of Service Request Signal*

Under certain instances, a subscriber may go off-hook during a time interval which coincides with the disabling of the number group detectors as a result of the operation of relay 30BC during the number group detector function. In addition, a subscriber may go off-hook concurrently with the process marking on terminating or originating calls. In any one of these instances, the number group conductors are preempted for other purposes. In view of the momentary nature of the service request signal by the calling substation, the pulse may terminate or be "lost" prior to the re-enabling of the number group detector circuit.

To cover this contingency, the present arrangement advantageously provides for recapturing and in effect regenerating any service request pulses which may have so occurred. The manner in which this is done is determined by the operation of relay 3DLO on the setup of an originating or terminating call and by relay 3DISC in the event of a disconnect function after completion of conversation.

It will be assumed for purposes of illustration of a regeneration function that substation 21 has initiated a service request pulse during an interval when, for any of the above reasons, the number group detector relays 3NGD— were disabled.

If, for example, substation 21 was denied access to the number group detector as a result of occupation by the latter with another prior calling subscriber, the subscriber of substation 21 remains connected through his package to the number group conductors but no further request signal is transmitted over these conductors. However, when relay 3DLO is operated during the marking function relative to the marking of a trunk to the previous calling subscriber (and specifically as a result of the operation of relays 3MNG— during the marking function), the number group return conductor NGR is opened. Ultimately, when the 160-volt potential at source 410 is interrupted by release relay 3RL, the path of relays 3MNG— is interrupted and any operated relays 3MNG— release. At this time, the contacts of relay 3DLO in the number group return conductor NGR are reclosed.

However, during the interval that the contacts of relay 3DLO were open and the number group return conductor was disconnected from ground potential, the call start relay 218 previously operated at substation 21 was released. The closure of the contacts of relay 3DLO in series with the number group return conductor NGR re-establishes the path for the operation of the call start relay 218, which now regenerates a momentary service request pulse during the charge time of capacitor 26 over the number group conductors NG1 and NG2. This regenerated service request is now received by the number group detectors 3NGD1 and 3NGD2 and is operated upon in a manner similar to that described above in an originating call sequence.

An analogous regeneration of the service request pulse at substation 21 is performed during a disconnect function when relay 3DISC is operated, upon the release of the trunk relay 4TRK1, in the manner described hereinabove, for a disconnect operation. It is apparent that the opening of the contacts of relay 3DISC in series with the number group return conductor NGR causes the release of call start relay 218 (or any other call start relay previously operated) for the time when the disconnect relay 3DISC is operated. Ultimately, when relay 3DISC is released during the usual disconnect function, the number group return conductor NGR is again connected to ground and the call start relay 218 will be re-operated to regenerate any service request condition that may have been "lost" theretofore.

*Simultaneous Service Request Calls*

It will be noted that the upper windings of relays 3NGD1, 3NGD2, etc. are all connected in parallel through diodes 331, 332, etc. to the upper winding of relay 3SO. The lower winding of relay 3SO is connected to potential source 330 to provide a biasing current therethrough.

The function of the circuitry including relay 3SO is to preclude response to the energization of an excessive number of number group conductors.

Assuming, for example, that substations 21 and 220 go off-hook precisely simultaneously the call start relays 218, etc. will deliver pulses of current through diodes 22, 23, 225 and 231 thereby energizing number group conductors NG1, NG2 and NG3.

This gives rise to the possibility of a spurious indication of a substation uniquely associated with conductors 1 and 3. To offset this possibility, relay 3SO is designed to operate when current flows through more than two diodes 331, 332, etc. indicating an abnormal number of detector relays 3NGD1, 3NGD2, etc. have been operated. Manifestly, when relay 3SO is operated, the line relay 4L for substation 21 and all other line relays are precluded from operating in view of the normally closed contacts of relay 3SO in series therewith. Since no line relay can operate, a false connection is precluded even though substations 21 and 220 have gone off-hook precisely simultaneously.

Thereafter, if the subscriber at substation 21 flashes his switchhook contacts his call start relay will be momentarily released and reoperated to deliver the usual pulses on conductors NG1 and NG2. This time, since only two conductors have been energized, relay 3SO will not be operated and a connection will be extended to substation 21 in accordance with the usual procedure described above.

Moreover, the subscriber at substation 220 will automatically be granted a connection to the central office as a result of the regeneration technique described above. Thus, during the marking operation for substation 21 the call start relay (not shown) of substation 220 will be automatically released when the contacts of relay 3DLO are opened in the number group return conductor NGR. When the call start relay for substation 220 is again actuated (on release of relay 3DLO) number group conductors NG2 and NG3 will be energized to operate the number group detector relays 3NGD2 and 3NGD3 (the latter not shown) which as usual through the translation relays 3TRSL2 and 3TRSL3 extend a connection to the line relay associated with substation 220—even though the switchook contacts at substation 220 have not been flashed by the party thereat.

In like manner a number of simultaneous calls greater than two will cause the operation of relay 3SO to preclude response to any request and the first party to flash his switchhook contacts will be granted service although the regeneration technique if more than two parties remain connected will again cause the operation of relay 3SO. This situation will continue until all of the parties except one have either disconnected or flashed their switchhooks. The last party will be automatically granted a connection in the manner described above.

*Trouble Timing Circuit*

Timer 326 is used as a general timing circuit to advance the cycle of operations in the applique circuit if the timing relay 3TRL operates over the contacts of relay 3NGT prior to the release of relay 3NGT at the contacts of relay 3DLO. If relay 3TRL operates the contacts thereof actuate relay 3CK over the lower winding thereof which in turn initiates the release of the marking circuit as described above.

It is understood that the above embodiments are merely illustrative and that various modifications may be made by those skilled in the art without departing from the spirit and scope of the invention.

What is claimed is:

1. A distributed telephone line concentrator system including a telephone central office, a plurality of trunks extending from said office, a greater plurality of substations remotely located from said office and from each other, a plurality of remote switching units individual to said substations and physically disposed in a multiplicity of areas contiguous to said substations, said remote units including means for connecting said substations to said trunks under control of said central office, means at said units for transmitting service request signals to said central office in response to service request conditions at said substations, and means at said central office responsive to the simultaneous transmission of service request signals from a plurality of remote units for blocking response thereto.

2. An automatic telephone line concentrator system including a telephone central office, a first plurality of trunks extending from said office, a second plurality of trunks extending from said office, a greater plurality of substations remote from said central office, a plurality of remote switching units individual to said substations, said units being disposed in a multiplicity of physically distinct locations contiguous to said substations, means at said units responsive to a service request indication at one of said substations for transmitting distinctive signals over said first plurality of trunks to said central office, additional means at said units for connecting said substations to said second plurality of trunks under control of said central office, and means at said central office responsive to the reception of simultaneous signals from a plurality of substation over said first plurality of trunks to inhibit reponse thereto.

3. An automatic telephone line concentrator system including a telephone central office, a first plurality of trunks extending from said office, a second plurality of trunks extending from said office, a plurality of remote substations greater in number than said trunks, a plurality of switching units individual and contiguous to said substations, said units including means connecting said substations to said first plurality of trunks in accordance with a code representative of the identity of said substations, means for connecting said substations to said second plurality of trunks under control of said central office, means for delivering a distinctive series of signals to said first plurality of trunks in response to a service request condition at one of said substations, a plurality of translation devices at said central office operable in response to the reception of said signals, a plurality of line units at said central office individually responsive to said translation devices in accordance with a code, and means at said central office responsive to the reception of a plurality of simultaneous service request signals for precluding operation of said line units.

4. An automatic telephone line concentrator system for connecting a plurality of substations to a telephone central office comprising a plurality of signal conductors extending from said office, a plurality of speech conductors extending from said office, a plurality of remote switching units individual to said substations and physically disposed along the longitude of said conductors in contiguity to said substations, means at said units for applying distinctive current pulses to said signal conductors in response to a service request condition at one of said substations, and means at said central office including an ambiguity detector connected to each of said signal conductors and responsive to current flow in more than a predetermined number of said conductors to preclude response thereto.

5. An automatic telephone line concentrator system in accordance with claim 4 wherein said ambiguity detector means includes a plurality of diodes individually connected to said signal conductors, a polarized relay having first and second windings, a plurality of resistors individually connected in series with said diodes, means for paralleling said resistors in a connection to said first winding, and means for delivering a predetermined bias current through said second winding.

6. A remote line concentrator system for connecting a plurality of substations over a lesser number of trunks to a central office comprising a plurality of remote concentrator switch units individual to said substations and physically disposed in a plurality of locations adjacent to said substations, said trunks including speech trunks and signal trunks, said switching units including means connecting said substations to said signal trunks in accordance with a code and means for connecting said substations to said speech trunks under control of said central office, primary and secondary crossbar switching means at said central office, means connecting said speech trunks to said secondary crossbar switching means in by-pass of said primary crossbar switching means, means connected to said primary crossbar switching means for energizing said signal trunks, and means at said central office responsive to a plurality of service request signals over said signal trunks for blocking response thereto.

7. A remote line concentrator system including a telephone central office, a plurality of signal conductors extending from said office, a plurality of speech trunks extending from said office, a plurality of substations remotely located from said office, a plurality of individual remote switching units contiguous to said substations for connecting said substations to said trunks under control of said central office, means at said units connecting said substations to said signal conductors in accordance with a code representative of the identity of said substations, means at said central office responsive to the reception of a plurality of simultaneous service requests over said signal conductors for precluding response thereto, primary crossbar switching means at said central office, secondary crossbar switching means at said central office, means connecting said speech trunks to the horizontal levels of said secondary crossbar switching means, and means connected to the vertical paths of said primary crossbar switching means for translating the equipment number of said substation in said office to the coded representation of the connection of said substation to said signal conductor.

8. An automatic telephone line concentrator system for connecting a larger plurality of substations over a relatively smaller number of trunks to a central office comprising a plurality of signal conductors extending from said substations to said central office, a plurality of individual remote switching units for connecting said substations to said trunks under control of said central office and for connecting said substations to said signal conductors in accordance with a code, means at said central office responsive to a plurality of simultaneous service requests at said substations over said signal conductors for precluding response thereto, and a plurality of translation relays at said central office individually responsive to said signal conductors for translating said coded representation to the equipment number of said substations in said central office.

9. An automatic telephone line concentrator system for connecting a plurality of substations over a lesser plurality of speech trunks to a central office comprising means at said central office responsive to a plurality of simultaneous service request indications at said substations for inhibiting a response to any of said service request indications, and additional means at said central office responsive to a momentary opening of the substation line at one of said service requesting substations for extending a connection to said substation.

10. A remote distributed telephone line concentrator system for connecting a number of substation lines over a smaller number of trunks to a central office comprising individual remote switching units contiguous to said substations, means at said units for connecting said substations to said trunks under control of said central office, means at said central office responsive to simultaneous service request conditions from a first and second of said substations for blocking response to either of said service request conditions, means at said central office responsive to the subsequent momentary opening of the substation line at said first substation for extending a connection to said first substation, and additional means responsive to the extension of said connection to said first substation for automatically extending a connection to said second substation.

11. A distributed telephone line concentrator system including a central office, a plurality of trunks extending from said office, a plurality of signal conductors extending from said office, a plurality of substations remote from said office and from each other, a plurality of remote switching units individual to said substations and physically disposed in a multiplicity of distinct locations proximate to said substations, common switching means at said central office, means at said central office for coupling said remote units to said common switching means, said coupling means including means responsive to the inception of originating and terminating calls to and from said substations for transferring information pertinent thereto to said common switching means without storing said information in said coupling means.

12. A telephone line concentrator system including a central office, a plurality of speech trunks and number group conductors extending from said office, a greater plurality of substations remote from said office and from each other, a plurality of remote switching units individual to said substations and physically disposed in a plurality of distinct locations proximate to said substations, means at said units for connecting said substations to said trunks under control of said central office and for connecting said substations to said number group conductors in accordance with a code representative of the concentrator number of said substation, means at said central office responsive to a service request indication at one of said substation transmitted over said number group conductors for identifying the concentrator number of said substation, translating means at said central office effective when energized to translate said concentrator number to the equipment number of said substation in said central office, and additional means responsive to said translation for restoring said identifying means to the normal condition.

13. A telephone line concentrator system including a telephone central office, a plurality of trunks and number group conductors extending from said office, a greater plurality of substations remotely located from said office, a plurality of individual switching units contiguous to said substations for connecting said substations to said trunks under control of said office and for connecting said substations to said number group conductors in accordance with a code representative of the concentrator number of said substation, primary and secondary crossbar switching means at said central office, means for connecting said trunks to the horizontal levels of said secondary crossbar switching means, means at said central office responsive to a disconnect indication at one of said substations for releasing the trunk connected to said substation, and additional means at said central office for marking said horizontal level during the disconnect operation to prevent the initiation of any additional disconnect operations.

14. A remote line concentrator system including a central office, a plurality of speech trunks and a plurality of signaling conductors extending from said office, a plurality of substations greater in number than said trunks and remotely located from said office, concentrator means for connecting said substations to said speech trunks in accordance with signals over said signaling conductors, means for connecting said signaling conductors to each of said substations, and means at said central office responsive to simultaneous service request conditions at a plurality of said substations for precluding the connection of a trunk to any of said substations.

15. A distributed telephone line concentrator system including a central office, a plurality of speech trunks, a plurality of number group conductors, a number group return conductor and a release conductor, said trunks and conductors extending from said central office, a plurality of substations greater in number than said trunks and remotely located from said central office, concentrator means for connecting said substations to said speech trunks in accordance with signals over said number group conductors, means in said concentrator means for coupling said substations to selected ones of said number group conductors and for connecting all of said substations to said number group return conductor and said release conductor, means at said central office responsive to a service request indication on said number group conductors for actuating a connection between said substation and a selected idle speech trunk, means at said central office responsive to a disconnect indication at said substation for releasing said connection over said release conductor, and additional means at said central office responsive to a plurality of simultaneous service request conditions at said substations over said number group conductors for precluding response to any of said service request indications.

16. A remote telephone line concentrator system including a central office, a plurality of speech trunks extending from said central office, a plurality of number group conductors extending from said office, a plurality of substations remotely located from said office and from each other, a plurality of individual remote switching units contiguous to said substations, said units including switching means for connecting said substations to said trunks under control of said central office and means for connecting said substations to said number group conductors in accordance with a code representative of the concentrator number of said substations, signaling means responsive to a service request indication at one of said substations for transmitting a distinctive group of pulses over said number group conductors to said central office, means at said central office responsive to the reception of a plurality of service request signals for inhibiting response thereto, additional means at said central office responsive to a single service request indication over said number group conductors for translating from said concentrator number to the equipment number unique to said substation in said central office, primary and secondary crossbar switching means in said central office, means for connecting said trunks to said secondary crossbar switching means, and means connected to said primary switching means for retranslating said identification from said equipment number to said concentrator number.

17. A remote telephone line concentrator system in accordance with claim 16 wherein said switching means includes first and second magnetic reed elements, permanent magnet means adjacent to said elements for maintaining said elements operated or released indefinitely, winding means on said elements connected to said trunks and a gas tube diode connected in series with said winding means.

18. A remote telephone line concentrator system in accordance with claim 17 wherein said signaling means includes a magnetic reed call start relay connected to said number group conductors and effective in response to a service request condition at one of said substations for applying a distinctive series of pulses representative of said substation to said central office.

19. A remote telephone line concentrator system including a telephone central office, a plurality of trunks extending from said office, a plurality of number group conductors extending from said office, a greater plurality of remote substations, a plurality of remote switching units individual to and contiguous to said substations for connecting said substations to said trunks under contro of said central office and for connecting said substations to selected number group conductors in accordance with a code, means at said switching units responsive to a service request indication at one of said substations for transmitting a distinctive group of signals to said central office over said number group conductors, ambiguity preventing means at said central office responsive to a plurality of simultaneous service request indications for precluding operation in response thereto, primary and secondary crossbar switching means at said central office, means for connecting said trunks to the horizontal levels of said secondary switching means, means at said central office responsive to a single service request indication for extending a path over said trunk and said secondary crossbar switching means to said service requesting substation, and means responsive to the operation of said ambiguity preventing means and the momentary interruption of the substation line at one of said service requesting substations for extending a connection to said substation.

20. A remote telephone line concentrator system in accordance with claim 19 including in addition means responsive to the operation of said ambiguity preventing means and the disconnection of all service requesting substations except one substation for automatically extending a connection to said one substation.

21. A telephone line concentrator system for connecting a plurality of remote substations on a percentage access basis over a lesser plurality of trunks to a telephone central office including control means at said central office responsive to signals from said substations for extending connections over said trunks to said substations, and additional means effective on the extension of said connections for precluding the storage of information individual to said substations in said control means.

22. A telephone switching system for connecting a plurality of units over a lesser plurality of shared channels to a telephone central office including applique means for coupling said channels to said office, and means in said applique means responsive to a specific service request indication for transmitting information representing the identity of said unit to said office including means for normalizing all information registrations in said applique means pertinent to said specific service request indication upon the transmission of said information to said office.

References Cited in the file of this patent

UNITED STATES PATENTS

| | | |
|---|---|---|
| 1,687,669 | Hinrichsen | Oct. 16, 1928 |
| 2,235,153 | Holden | Mar. 18, 1941 |
| 2,599,358 | Cahill et al. | June 3, 1952 |
| 2,794,121 | Bjornson | May 28, 1957 |
| 2,894,073 | Blount et al. | July 7, 1959 |
| 2,976,367 | Bruce et al. | Mar. 21, 1961 |
| 2,979,571 | Libois et al. | Apr. 11, 1961 |